United States Patent
Spaan et al.

(10) Patent No.: US 8,124,684 B2
(45) Date of Patent: Feb. 28, 2012

(54) FRICTION COMPOSITION FOR A SEAT BELT AND A SEAT BELT COATED WITH SUCH A COMPOSITION

(75) Inventors: Marcel Spaan, Hasselt (BE); Chris van Helvoort, Boxtel (NL); Anita Pool, Eindhoven (NL)

(73) Assignee: Autoliv Development AB, Vargarda (SE)

( * ) Notice: Subject to any disclaimer, the term of this patent is extended or adjusted under 35 U.S.C. 154(b) by 216 days.

(21) Appl. No.: 12/600,863

(22) PCT Filed: Jun. 25, 2007

(86) PCT No.: PCT/EP2007/056308
§ 371 (c)(1),
(2), (4) Date: Nov. 19, 2009

(87) PCT Pub. No.: WO2009/000320
PCT Pub. Date: Dec. 31, 2008

(65) Prior Publication Data
US 2010/0164273 A1     Jul. 1, 2010

(51) Int. Cl.
*C08L 75/00* (2006.01)
*C08L 83/00* (2006.01)
*A62B 35/00* (2006.01)

(52) U.S. Cl. .................. 524/507; 524/506; 297/468

(58) Field of Classification Search .................. 524/506, 524/507; 297/468; 525/101
See application file for complete search history.

(56) References Cited

U.S. PATENT DOCUMENTS 3,246,048 A * 4/1966 Haluska .................... 528/27
4,605,571 A    8/1986 Watanabe et al.
RE32,757 E * 9/1988 Yamazaki et al. ......... 428/423.1
(Continued)

FOREIGN PATENT DOCUMENTS
EP     0 655 488 A1    5/1995
(Continued)

*Primary Examiner* — Timothy J. Kugel
*Assistant Examiner* — Aiqun Li
(74) *Attorney, Agent, or Firm* — Brinks Hofer Gilson & Lione

(57) ABSTRACT

The present invention relates to a low friction composition for a seat belt, characterized in that it comprises the following components:
- a polyether polyurethane;
- a low molecular weight polyurethane, with free NCO groups, and containing an aliphatic chain;
- a polyurethane without free NCO groups;
- a polyethylene;
- a polydimethylsiloxane.

It also deals with a seat belt which is coated with such a composition.

15 Claims, No Drawings

U.S. PATENT DOCUMENTS

| | | | |
|---|---|---|---|
| 4,945,123 A * | 7/1990 | Miyama et al. | 524/269 |
| RE35,060 E * | 10/1995 | Wu | 560/184 |
| 5,939,138 A * | 8/1999 | Nagahara et al. | 427/177 |
| 5,962,620 A * | 10/1999 | Reich et al. | 528/76 |
| 7,078,102 B2 * | 7/2006 | Robertson | 428/424.2 |

FOREIGN PATENT DOCUMENTS

| | | |
|---|---|---|
| JP | P2000-328080 A | 11/2000 |
| JP | P2001-225717 A | 8/2001 |
| WO | WO 2007/070771 A1 | 6/2007 |

\* cited by examiner

FRICTION COMPOSITION FOR A SEAT BELT AND A SEAT BELT COATED WITH SUCH A COMPOSITION

CROSS REFERENCE TO RELATED APPLICATIONS

This application is a national stage (371) of PCT/EP2007/056308 filed Jun. 25, 2007.

FIELD OF INVENTION

The present invention relates to a low friction composition for a seat belt. It also relates to a seat belt which is coated with such a composition.

BACKGROUND OF INVENTION

The extraction and retraction behaviour of a seat belt of a vehicle, initially and after wearing, is very important.

As a matter of fact, in the event of a crash, fast extraction and/or the retraction is preferred.

Consequently, there is a need to improve the properties of the seat belt by reducing their friction parameters.

An attempt to reach this goal is described in JP 2000328080. An agent for a low friction treatment of seat belts is disclosed comprising a polyurethane resin and a polyurethane composition containing spherical hydrophobic silica.

This agent is discussed as preventing the decrease of properties such as slidability, wear resistance, and adhesion of dirt.

Another solution is described in JP2001225717. It consists of a friction reducing treatment agent which comprises two types of dimethyl polysiloxane and modified silicone oil.

The first aim of the present invention is to propose a new low friction composition for a seat belt, which not only increases smooth handle properties to said belt, but also increases the friction properties expressed in retraction speed of the belt in the retractor.

DETAILED DESCRIPTION OF THE INVENTION

According to the present invention, this low friction composition for a seat belt, is characterized in that it comprises the following components a) through e):
  a) a polyether polyurethane;
  b) a low molecular weight polyurethane, with free NCO groups, and containing an aliphatic chain;
  c) a polyurethane without free NCO groups;
  d) a polyethylene;
  e) a polydimethylsiloxane.

According to additional advantageous but non limiting features of this composition:
  said polyether polyurethane (component a) is a soft self cross linked hydrophobic polyether polyurethane;
  it may further comprise a fluorocarbon polymer (component f);
  said polymer f) is a fluoroalkylacrylate polymer;
  said components a) through e) and optionally f) are in the form of a dispersion or an emulsion in water.

The composition is further described as comprising providing the components in concentrations expressed as (percentages in volume, based on the total volume of the composition) of:
  component a): 25-35 ml
  component b): 4-6 ml;
  component c): 4-6 ml;
  component d): 1-3 ml;
  component e): 35-45 ml;
  water: 1000 ml
  it may further comprise providing in the concentration (percentage in volume, based on the total volume of the composition) of:
  component f): 4-6 ml.

The invention also relates to a seat belt which is coated with a composition according to any one of the above characteristics.

According to additional advantageous but nonlimiting features of this belt, the belt comprises:
  after drying of said composition has concentrations (percentages in weight, based on the total weight of the belt) of:
  component a): 0.36-0.48%;
  component b): 0.06-0.08%;
  component c): 0.06-0.08%;
  component d): 0.02-0.03%;
  component e): 0.48-0.64%;
  it may further comprise, after drying of said composition, has a concentration (percentage in weight, based on the total weight of the belt) of:
  component f): 0.06-0.08%;

The belt may be made of synthetic fibers and may be polyethylene terephthalate fibers.

Other characteristics and advantages of the present invention will appear on reading the following detailed description.

As already said, the present low friction composition is to be applied to seat belts, these belts being made, preferably, of synthetic fibres. In a specific application, said belts are made of polyethylene terephthalate fibers.

This composition is preferably applied on a dimensional stabilized seat belt by heat. The composition will be preferably applied by padding and curing at a temperature of 150° C.

The seat belts treated with this composition are excellent in friction reduction, on extraction and retraction behaviour, initial and after wearing.

The seat belt itself gives an extremely smooth handle property.

Component a) is polyether polyurethane. Preferably, it consists of a soft self cross linked polyether polyurethane. Such a product improves the dry rub and the hexbar abrasion of the belt.

Component b) is a low molecular weight cross linked polyurethane with free NCO groups, containing an aliphatic chain, and component c) is a rigid polyurethane.

In a specific embodiment the average molecular weight of component b) is 670 g/mol.

The combination of these two compounds will improve the friction.

Component d), which consists of polyethylene, also improves the friction.

The function of component e), which is a polydimethylsiloxane, is to improve the smooth handle properties of the belt, together with the wet rub and the abrasion.

Component f), which is a fluorocarbon polymer, and preferably a fluoroalkylacrylate copolymer, improves the water and oil repellency. But it has not significant impact on the other properties of the coating.

Advantageously, theses components are in the form of a dispersion or an emulsion in water.

With such a coating, the friction of the seat belts is extremely lowered. The retraction and extraction properties in a dynamic situation are improved. Especially, the velocity of the retraction speed will be increased by 50% in a standard test configuration.

The combination of components a) to d) give an added value on the friction characteristics of the seat belt.

The invention claimed is:

1. A low friction composition for a seat belt comprising the following components:
   a) a soft self crosslinked hydrophobic polyether polyurethane;
   b) a polyurethane, with free NCO groups, and containing an aliphatic chain;
   c) a polyurethane without free NCO groups;
   d) a polyethylene; and
   e) a polydimethylsiloxane.

2. A low friction composition according to claim 1 further comprising component f) in the form of a fluorocarbon polymer.

3. A low friction composition according to claim 2, wherein said fluorocarbon polymer is a fluoroalkylacrylate polymer.

4. A low friction composition according to claim 1, wherein the components are in the form of a dispersion or an emulsion in water.

5. A low friction composition according to claim 1, wherein the components are provided in concentrations of:
   component a): 25-35 ml;
   component b): 4-6 ml;
   component c): 4-6 ml;
   component d): 1-3 ml;
   component e): 35-45 ml; and in a solution of
   water: 1000 ml.

6. A low friction composition according to claim 5, characterized in that it further comprises component f) in the form of a fluorocarbon polymer in a concentration of 4-6 ml.

7. A seat belt which is coated with a composition according to claim 1.

8. A seat belt according to claim 7, characterized in that it comprises, after drying of said composition the components in concentrations (percentages in weight, based on the total weight of the belt) of:
   component a): 0.36-0.48%;
   component b): 0.06-0.08%;
   component c): 0.06-0.08%;
   component d): 0.02-0.03%; and
   component e): 0.48-0.64%.

9. A seat belt according to claim 8, characterized in that it further comprises component f) in the form of a fluorocarbon polymer in a concentration after drying of said composition (percentage in weight, based on the total weight of the belt) of:
   component f): 0.06-0.08%.

10. A seat belt according to claim 8, wherein it is made of synthetic fibers.

11. A seat belt according to claim 10, characterized in that said fibers are polyethylene terephthalate fibers.

12. A low friction composition according to claim 2, wherein the components are in the form of a dispersion or an emulsion in water.

13. A seat belt which is coated with a composition according to claim 2.

14. A seat belt according to claim 9, wherein it is made of synthetic fibers.

15. A seat belt according to claim 14, characterized in that said synthetic fibers are polyethylene terephthalate fibers.

* * * * *